(12) United States Patent
Yang

(10) Patent No.: US 7,726,830 B2
(45) Date of Patent: Jun. 1, 2010

(54) STRUCTURE OF FIBER OPTICS DECORATION

(76) Inventor: Chin-Sheng Yang, 4F., No. 26, Lane 358, Yung-An St., Tainan City (TW)

( * ) Notice: Subject to any disclaimer, the term of this patent is extended or adjusted under 35 U.S.C. 154(b) by 84 days.

(21) Appl. No.: 12/238,461

(22) Filed: Sep. 26, 2008

(65) Prior Publication Data

US 2010/0080015 A1 Apr. 1, 2010

(51) Int. Cl.
*F21V 33/00* (2006.01)

(52) U.S. Cl. .................... 362/101; 362/806; 362/565

(58) Field of Classification Search ............... 362/101, 362/806, 565
See application file for complete search history.

(56) References Cited

U.S. PATENT DOCUMENTS

| | | | | |
|---|---|---|---|---|
| 2,453,177 A | * | 11/1948 | Abramson | 40/406 |
| 4,070,777 A | * | 1/1978 | Lo Giudice | 40/406 |
| 4,170,035 A | * | 10/1979 | Walker | 362/96 |
| 5,599,092 A | * | 2/1997 | Yen | 362/294 |
| 6,449,887 B1 | * | 9/2002 | Song | 40/406 |
| 6,585,387 B1 | * | 7/2003 | Lee | 362/96 |
| 6,604,835 B2 | * | 8/2003 | Zale | 362/101 |
| 6,740,849 B1 | * | 5/2004 | Cho | 219/200 |
| 2007/0291472 A1 | * | 12/2007 | Finkle | 362/101 |

* cited by examiner

*Primary Examiner*—Anabel M Ton
(74) *Attorney, Agent, or Firm*—Leong C. Lei

(57) ABSTRACT

A fiber optics decoration includes a base that includes a light source and an element that induces an electrical resistive effect to generate heat upon being energized, a decoration body, and optic fibers. The decoration body forms at least one bore extending therethrough for receiving and retaining the optic fibers therein. A container is formed around the bore and receives therein a low boiling point liquid. The container has a bottom positioned against the element that generates heat. As such, when the bottom of the decoration body is subjected to heat generated by the element arranged in the base, a liquid flow of the low boiling point liquid is caused. At the same time, the light source of the base emits light that is transmitted through the optic fibers to realize lighting decorative effect of the fiber optics decoration.

3 Claims, 4 Drawing Sheets

STRUCTURE OF FIBER OPTICS DECORATION

TECHNICAL FIELD OF THE INVENTION

The present invention generally relates to a fiber optics decoration, and particularly to a lighting decoration that shows the effectiveness of a fiber optics lighting device and that comprises a base, which, upon energization, gives off heat, positioned against a bottom of a decoration body that is filled with a low boiling point liquid and has optic fibers fit therein so as to induce dual effects of fiber optics lighting and liquid flowing.

DESCRIPTION OF THE PRIOR ART

The most commonly used decorations positioned on a desktop or a table top are photo frame, toy decoration, art decoration, and lighting decoration. Among the known lighting decorations, one that is shown in FIG. 4 of the attached drawing is composed of a light-transmitting container 4 and a base 5. The light-transmitting container 4 is filled with a low boiling point liquid B (such as methylene chloride). The base 5 receives therein a halogen lamp assembly 51, which is positioned against the bottom of the light-transmitting container 4. Thus, when the base 5 receives an external supply of electrical power that energizes the halogen lamp assembly 51 to give off light and heat, causing a liquid flow of the low boiling point liquid B inside the light-transmitting container 4 and propagation of light to thereby enhance decorative effect of the lighting decoration.

However, the known lighting decoration uses the halogen lamp assembly 51 to realize generation of light and heat and such heat is used to cause a liquid flow of the low boiling point liquid B contained in the light-transmitting container 4. Although the liquid is a substance of low boiling point (such as methylene chloride), the liquid flow can only be formed with the liquid being heated up to a predetermined temperature level. Apparently, the lamp bulb of the halogen lamp assembly 51 must be of a wattage that is sufficiently high; otherwise no liquid flow will be caused. On the other hand, when the halogen lamp bulb has a high wattage, a challenge for reduction of power expenses and costs is present. Further, the known lighting decoration is of such a design that needs to fill the light-transmitting container 4 with the low boiling point liquid B and uses a halogen lamp assembly 51 to provide light and heat; thus, versatility of design is subjected to limitation. Also, it is difficult to mate the outside visual effect of the lighting decoration with other materials. These are drawbacks that require further improvement.

In view of this, based on years' experience in development and manufacturing of decorations and arrangement of decorations, the present applicant wishes to provide a decoration that provides sufficient light to demonstrate a desired outside appearance of the decoration but requiring no high-wattage lamp bulb, at least for the purposes of saving power consumption, so that variation of the decoration can be easily done and mating of the decoration with other decorative material can also be easily realized. With successive attempts in making extensive development of decorations, a fiber optics decoration in accordance with the present invention is created and will be described in detail hereinafter.

SUMMARY OF THE INVENTION

Thus, the present invention provides a fiber optics decoration that comprises a base, a decoration body, and optic fibers. The base receives and retains therein a circuit device that comprises a light source and a heat generation element that induces an electrical resistive effect to generate heat.

The decoration body forms at least one bore extending therethrough for receiving and retaining the optic fibers therein. A container is formed around the bore and receives therein a low boiling point liquid. The container has a bottom positioned against the element that generates heat. As such, when the bottom of the decoration body is subjected to heat generated by the element arranged in the base, a liquid flow of the low boiling point liquid is caused. At the same time, the light source of the base emits light that is transmitted through the optic fibers to realize lighting decorative effect of the fiber optics decoration.

The foregoing objective and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
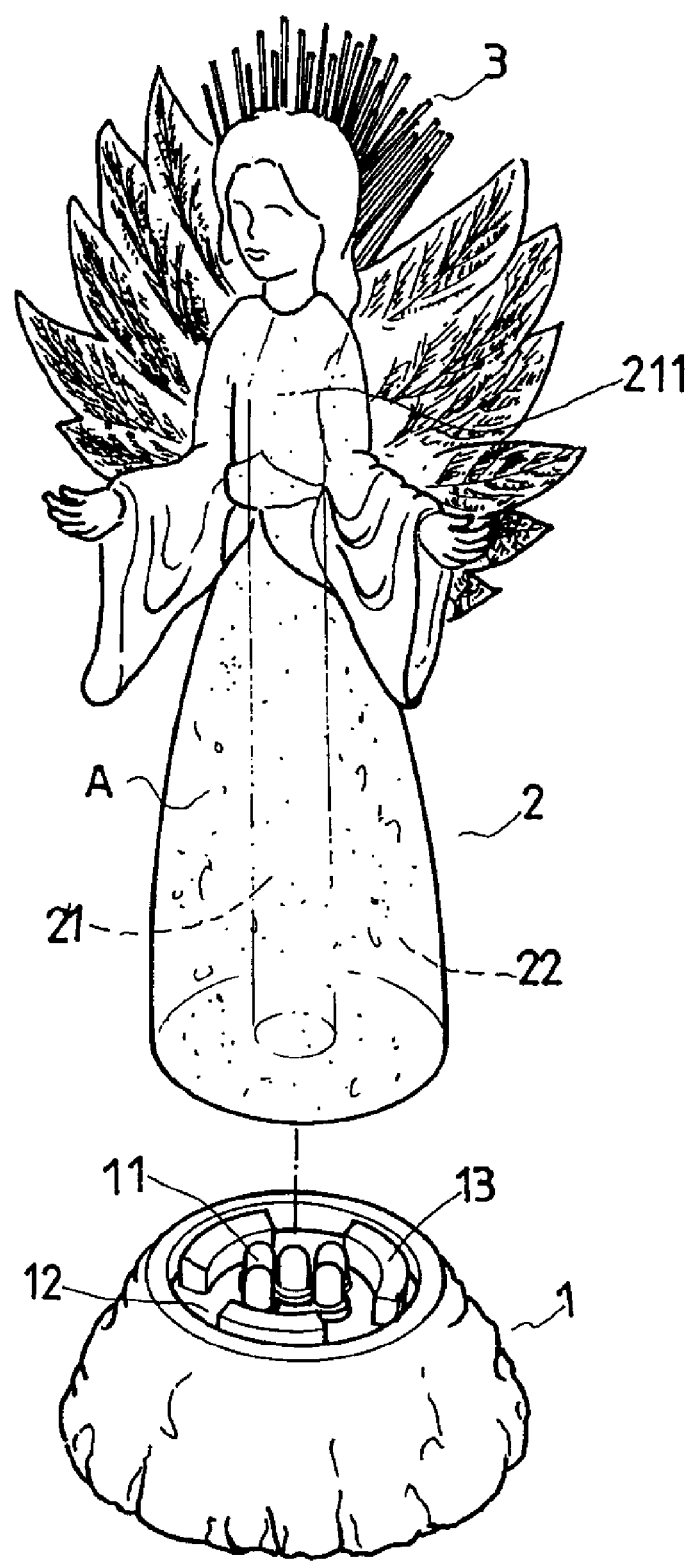
FIG. 1 is an exploded view of a fiber optics decoration in accordance with the present invention.
Figure 2:
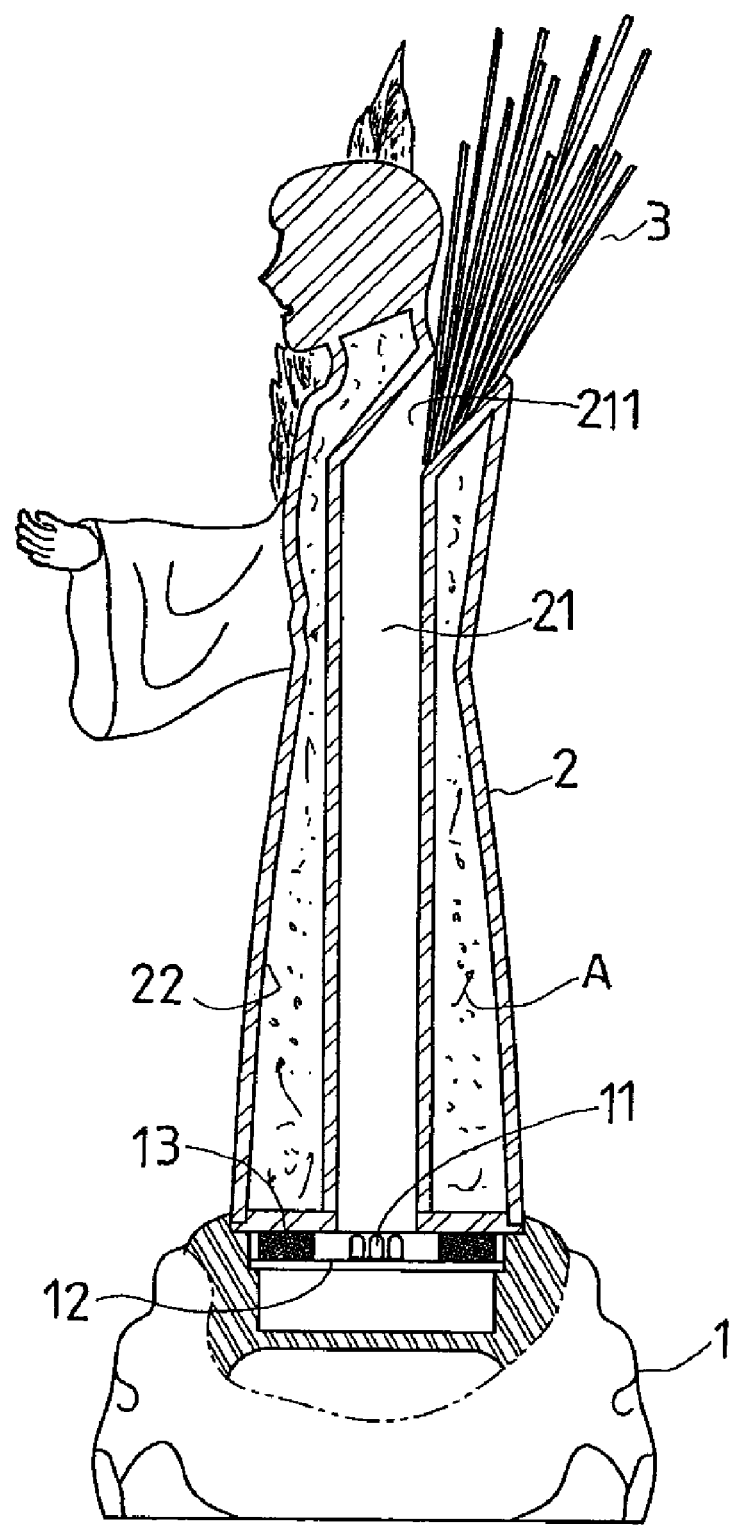
FIG. 2 is a cross-sectional view of the fiber optics decoration of the present invention.

With reference to FIGS. 1 and 2, which respectively show an exploded view and a cross-sectional view of a fiber optics decoration constructed in accordance with the present invention, the fiber optics decoration of the present invention comprises a base 1, a decoration body 2, and optic fibers 3.

The base 1 is mounted underneath the decoration body 2 and receives and retains therein a circuit device 12 that comprises a light source 11. The circuit device 12 comprises a heat generation element 13 that may induce a resistive effect. The heat generation element 13 can be for example an ordinary electrical resistor, a cement resistor, and an electrical heating wire, or an electrical heating pad.

The decoration body 2 has an outside appearance that can be any three-dimensional light-transmittable configuration. The decoration body 2 defines a bore 21 that extends upward from a bottom of the decoration body 2 and completely through the decoration body 2. The bore 21 constitutes a bent section 211 at an upper opening thereof to allow the optic fibers 3 to fit into and retained in the bent section 211. A container 22 is formed around the bore 21 for receiving therein at least one low boiling point liquid A (such as methylene chloride). If desired, the low boiling point liquid may be mixed with flake- and/or particle-like spangles. The container 22 has a bottom that is positioned exactly on the heat-generation element 13 of the base 1.

Figure 3:
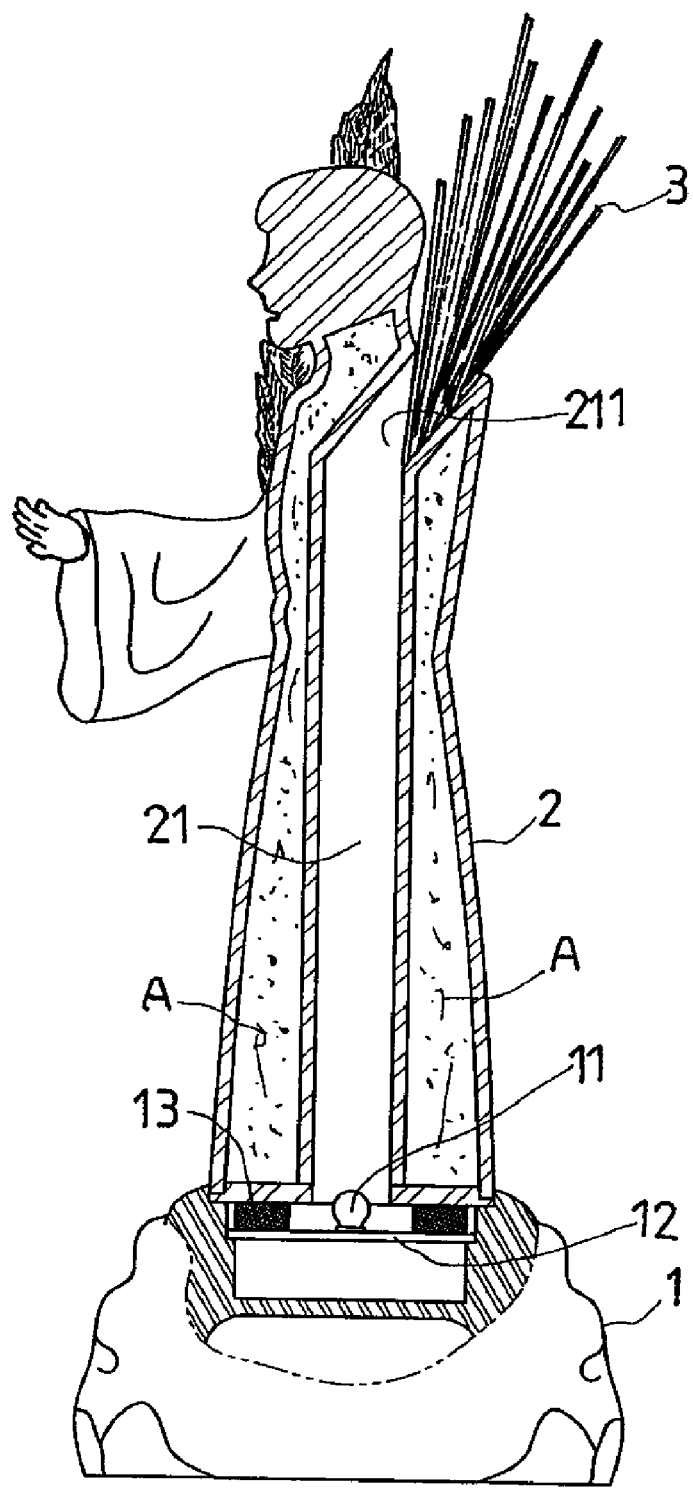
FIG. 3 is a cross-sectional view of a variant embodiment of the fiber optics decoration of the present invention.
Figure 4:
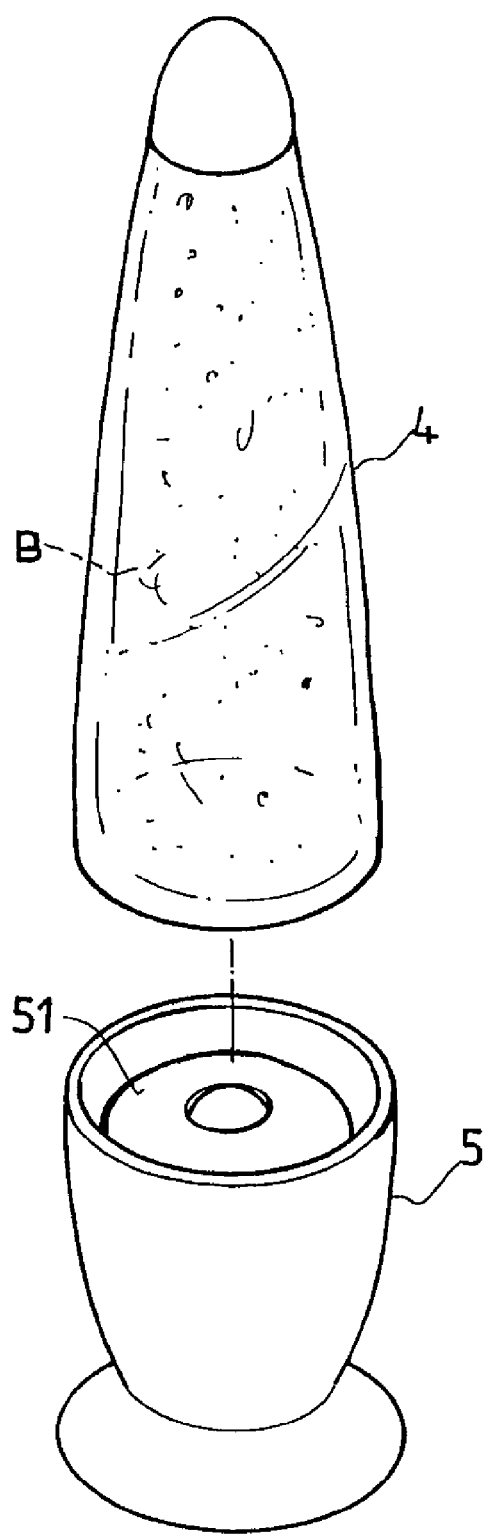
FIG. 4 is an exploded view of a conventional decoration.

Further referring to FIGS. 2 and 3, to assemble, the container 22 of the decoration body 2 is first filled with at least one low boiling point liquid A (such as methylene chloride, or alternatively, the low boiling point liquid A being mixed with flake- and/or particle-like spangles) and the bottom thereof is sealed and fixed by means of for example low frequency techniques. The optic fibers 3 are then fit into the bent section 211 of the bore 21 of the decoration body 2. The circuit device 12, which carries the light source 11 (that can be for example a halogen lamp or a light-emitting diode) and the heat generation element 13, is thereafter set into the base 1. The decoration body 2 is then positioned on the base 1 with the heat generation element 13 of the base 1 positioned against the bottom of the decoration body 2. When an external power source is actuated to supply electrical power to the circuit device 12, the heat generation element 13 generates and gives off heat and the light source 11 generates and gives off light that irradiates the low boiling point liquid A inside the container 22 of the decoration body 2, whereby the low boiling point liquid A is heated by the heat generated by the energization of the heat generation element 13 and induces a liquid flow and colorful light illuminates the low boiling point liquid inside the decoration body 2. At the same time, the light from the light source 11 is also distributed to the optic fibers 3 that are partially received in the bore 21 of the decoration body 2, whereby the light is transmitted through the optic fibers 3 and forms fiber optics lighting that adds an overall dazzling effect.

From the above description of the constituent parts and operation of the fiber optics decoration in accordance with the present invention, several advantages can be recognized and will be briefed as follows:

(1) The fiber optics decoration of the present invention uses a circuit device that is received in a base and comprises a light source and a heat generation element in such a way that the heat generation element is positioned against a decoration body to induce a liquid flow of a low boiling point liquid inside the decoration body and the light source emits light irradiating optic fibers to generate a dazzling lighting effect. In other words, the present invention uses the function of the light source that emits light and that of the heat generation element that upon energized gives off heat for operation purposes to cause the liquid flow of the low boiling point liquid. By means of the deliberate cooperation between the two, together with light transmission realized through the optic fibers, the present invention provides versatility of designs in the field and offers the advantages of saving power.

(2) In accordance with the above description, the decoration body incorporated in the present invention forms a bore that facilitates illumination of the liquid contained in the decoration body with the light generated from the light source and also functions to receive and retain a bundle of optic fibers in a bent section thereof for transmitting light, whereby the optic fibers help enhancing the brightness of the illumination of light on the decoration body and provide a fancy decorative effect.

To conclude, the above description of the integral formation of the structure in accordance with the embodiment of the present invention reveals that the present invention does perfectly exhibit the decorative characteristics realized through the optic fibers and the constituent parts of the present invention uses a heat source to cause a liquid flow and further uses a light source to illuminate the liquid flow to show a vivid dynamic decorative effect.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. A fiber optics decoration, comprising a base that receives and retains therein a circuit device comprising a light source and an element that induces an electrical resistive effect to generate heat upon being energized, a decoration body, and optic fibers, wherein:

the decoration body has an outer appearance of a predetermined shape having a light-transmittable three-dimensional configuration, the decoration body forming a bore extending upward from a bottom of the decoration body and completely through the decoration body, the bore comprising a bent section at an upper opening thereof for receiving and retaining the optic fibers therein, a container being formed around the bore and receiving therein a low boiling point liquid, the container having a bottom positioned against the element of the base, the element that generates heat comprising a cement resistor;

whereby the bottom of the decoration body is subjected to heat and light respectively generated by the electrical resistive effect of the element and the light source arranged in the base to cause a liquid flow of the low boiling point liquid inside the containers of the decoration body and to allow light to irradiate the optic fibers that transmits the light to induce an additional decorative effect.

2. A fiber optics decoration, comprising a base that receives and retains therein a circuit device comprising a light source and an element that induces an electrical resistive effect to generate heat upon being energized, a decoration body, and optic fibers, wherein:

the decoration body has an outer appearance of a predetermined shape having a light-transmittable three-dimensional configuration, the decoration body forming a bore extending upward from a bottom of the decoration body and completely through the decoration body, the bore comprising a bent section at an upper opening thereof for receiving and retaining the optic fibers therein, a container being formed around the bore and receiving therein a low boiling point liquid, the container having a bottom positioned against the element of the base, the element that generates heat comprising an electrical heating wire;

whereby the bottom of the decoration body is subjected to heat and light respectively generated by the electrical resistive effect of the element and the light source arranged in the base to cause a liquid flow of the low boiling point liquid inside the containers of the decoration body and to allow light to irradiate the optic fibers that transmits the light to induce an additional decorative effect.

3. A fiber optics decoration, comprising a base that receives and retains therein a circuit device comprising a light source and an element that induces an electrical resistive effect to generate heat upon being energized, a decoration body, and optic fibers, wherein:

the decoration body has an outer appearance of a predetermined shape having a light-transmittable three-dimensional configuration, the decoration body forming a bore extending upward from a bottom of the decoration body and completely through the decoration body, the bore comprising a bent section at an upper opening thereof for receiving and retaining the optic fibers therein, a container being formed around the bore and receiving therein a low boiling point liquid, the container having a bottom positioned against the element of the base, the element that generates heat comprising an electrical heating pad;

whereby the bottom of the decoration body is subjected to heat and light respectively generated by the electrical resistive effect of the element and the light source arranged in the base to cause a liquid flow of the low boiling point liquid inside the containers of the decoration body and to allow light to irradiate the optic fibers that transmits the light to induce an additional decorative effect.

* * * * *